Figure 1:
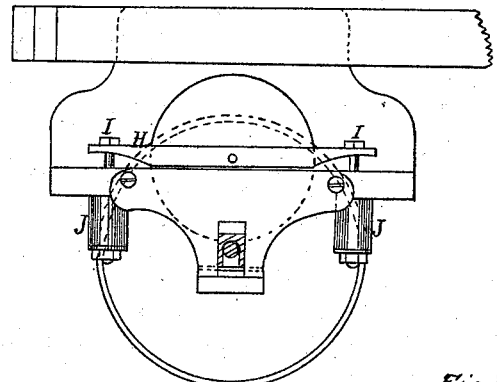
Figure 3:
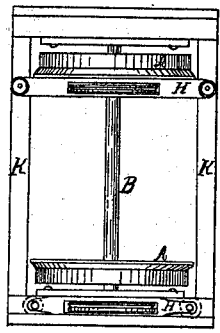
Figure 2:
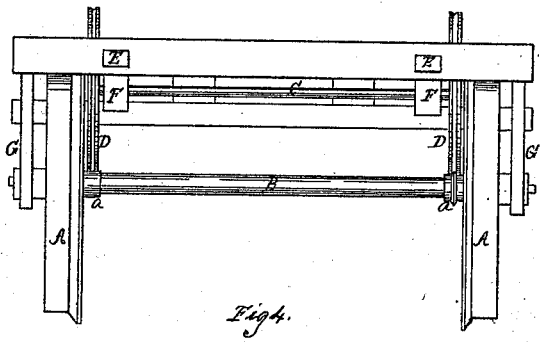
Figure 4:
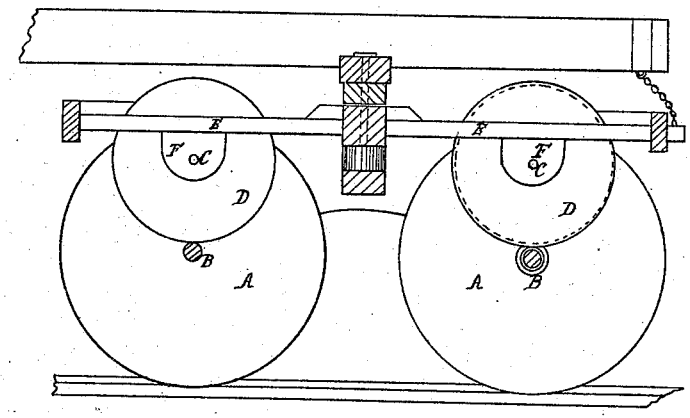

W. S. SHOTWELL.
RAILWAY TRUCK.

No. 75,476. Patented Mar. 10, 1868.

Witnesses
Cornelius Cox
H. A. Seatman

Inventor
W. S. Shotwell
per
Alexander D. Mason
Atty

United States Patent Office.

WALTER S. SHOTWELL, OF PATERSON, NEW JERSEY.

Letters Patent No. 75,476, dated March 10, 1868.

---

IMPROVED RAILWAY-TRUCK.

---

The Schedule referred to in these Letters Patent and making part of the same.

---

TO ALL WHOM IT MAY CONCERN:

Be it known that I, WALTER S. SHOTWELL, of Paterson, in the county of Passaic, and in the State of New Jersey, have invented new and useful Improvements in Railroad-Trucks; and do hereby declare that the following is a full, clear, and exact description thereof, reference being had to the accompanying drawings, and to the letters of reference marked thereon.

In the annexed drawings, making part of this specification, A and B represent the wheels and axle now in general use upon railway-cars. Above these wheels and axles I use the ordinary truck-frame, except that I secure to it two bars, E E, which run lengthwise of the car, and which are provided on their under side with the ears F F. C represents axles, which are placed immediately over the axles B, and which have their bearings in the ears F. Upon these axles C are secured the supplementary wheels D D, the periphery of which reaches down and rests upon the axles B B. The weight of the car is thus borne upon the axles C C, and transferred through wheels D to the upper side of axles B B. By this arrangement there is only the friction of speed in the journal-boxes of the axles B, without that of weight, as is usually the case, while in the boxes of the axles C there is the friction of weight without that of speed. The periphery of the wheels D D is grooved, and the axles B B are provided with chilled collars, upon which are flanges, as seen at a, to run in the grooves of the wheel. By this arrangement the axles are connected together in such a manner that they play laterally always together.

To adapt this supplementary wheel and axle to street-railway cars, I use two cross-ties, K, one before and the other behind the wheels A. The ends of these cross-ties are secured to the bed-pieces of the car-frame. Extending from one of these ties to the other are two bars, H, which are placed at any desirable distance from the main wheels A. These bars H may be formed of iron, and provided with a vertical slot at their centres, in which is placed the supplementary wheel D. The wheel in this case is provided with a short axle, which has its bearings in the bar H. I I represent bolts which pass up through the ties K, and then through the ends of the bars H, being surrounded above said bars with the rubber springs J J. As the bars H are about three feet long, it will be seen that the bearings are equalized on each side of the main axle B, and about a foot and a half from it; thus, on a car with four wheels, there are eight bearing-points, two for each wheel. The bars H are intended to be placed between the wheels A, that is, to the inside of them, and as close together as practicable.

Figure 5:
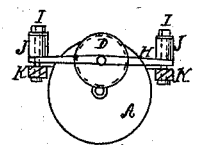

In Figure 1, the rubber springs J are beneath the bar H, and in Figure 5 they are above it. They may be placed either above or below, as may be desirable. The bars E may be made either of iron, steel, or wood, but they are intended to be so constructed that they will act as springs, yielding upward, and vibrating so as to relieve the jar of the cars. This mode of hanging the shafts C to a vibrating or spring-bar dispenses with the present expensive mode of hanging the cars on springs of rubber and other material. Instead of using a collar upon the axle B, I may simply throw up a flange to run in the groove D, and have this portion of the said axle B chilled or hardened, so as not to be injured by the tread of wheel D. There will be no bearing upon the flange, as it is intended only as a guide, and to connect the axles together, so that they will play alike laterally.

Having thus fully described my invention, what I claim as new, and desire to secure by Letters Patent, is—

1. The wheels D, with grooved periphery, in combination with shaft B, provided with a flange or flanged collar, a, substantially as and for the purpose specified.

2. The arrangement of the bars H H with the cross-ties K K, the wheels D D, and the axles B B, whereby I am enabled to have a double number of bearings, and to have said bearings at any desirable point between the wheels A, or outside of them if necessary, as is herein fully set forth.

In testimony that I claim the foregoing, I have hereunto set my hand, this 23d day of January, 1868.

W. S. SHOTWELL.

Witnesses:
V. D. STOCKBRIDGE,
A. A. YEATMAN.